H. POOLEY.
AUTOMATIC INDICATOR WEIGHING MACHINE OR WEIGH BRIDGE.
APPLICATION FILED NOV. 22, 1907.
906,657.
Patented Dec. 15, 1903.
3 SHEETS—SHEET 2.
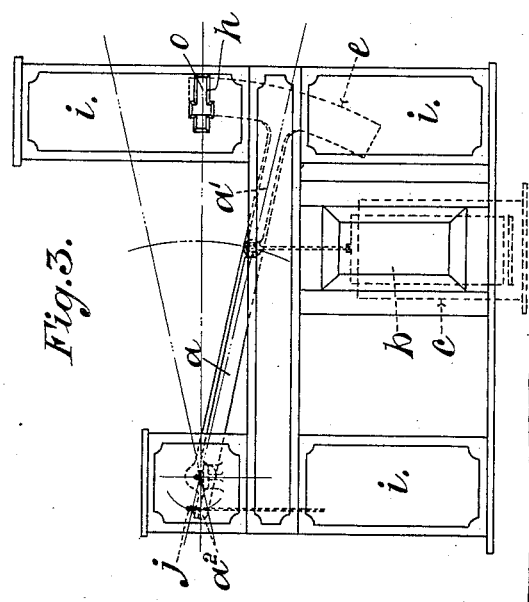
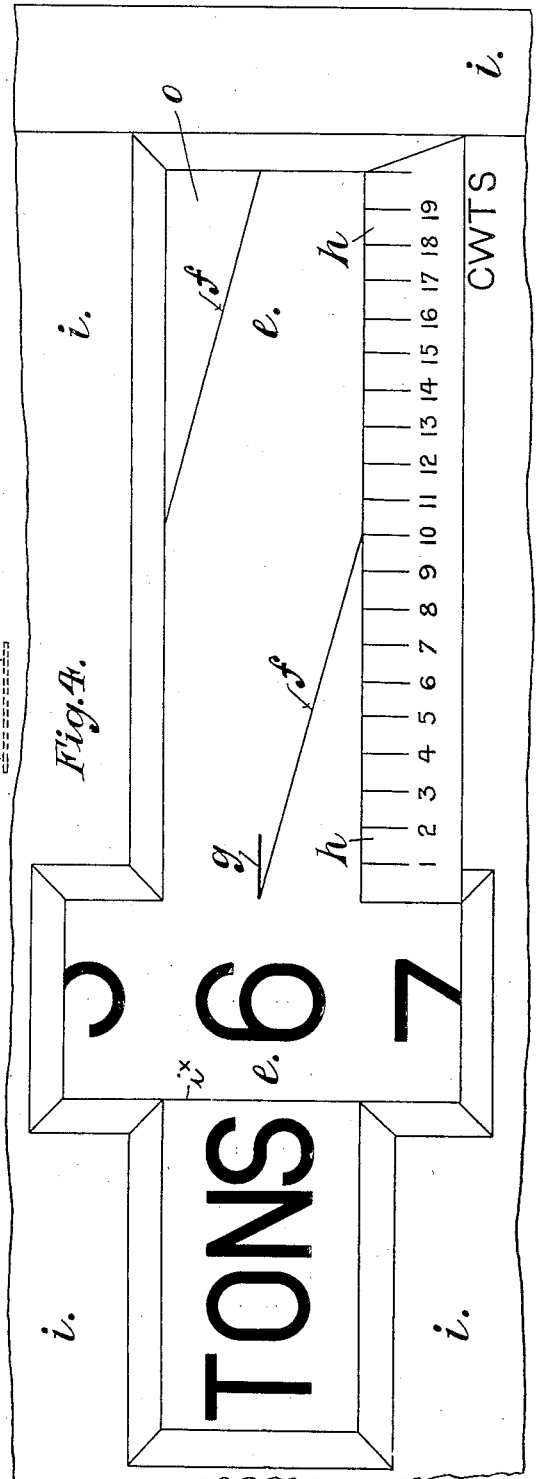
WITNESSES:
INVENTOR
Henry Pooley
ATTORNEY.

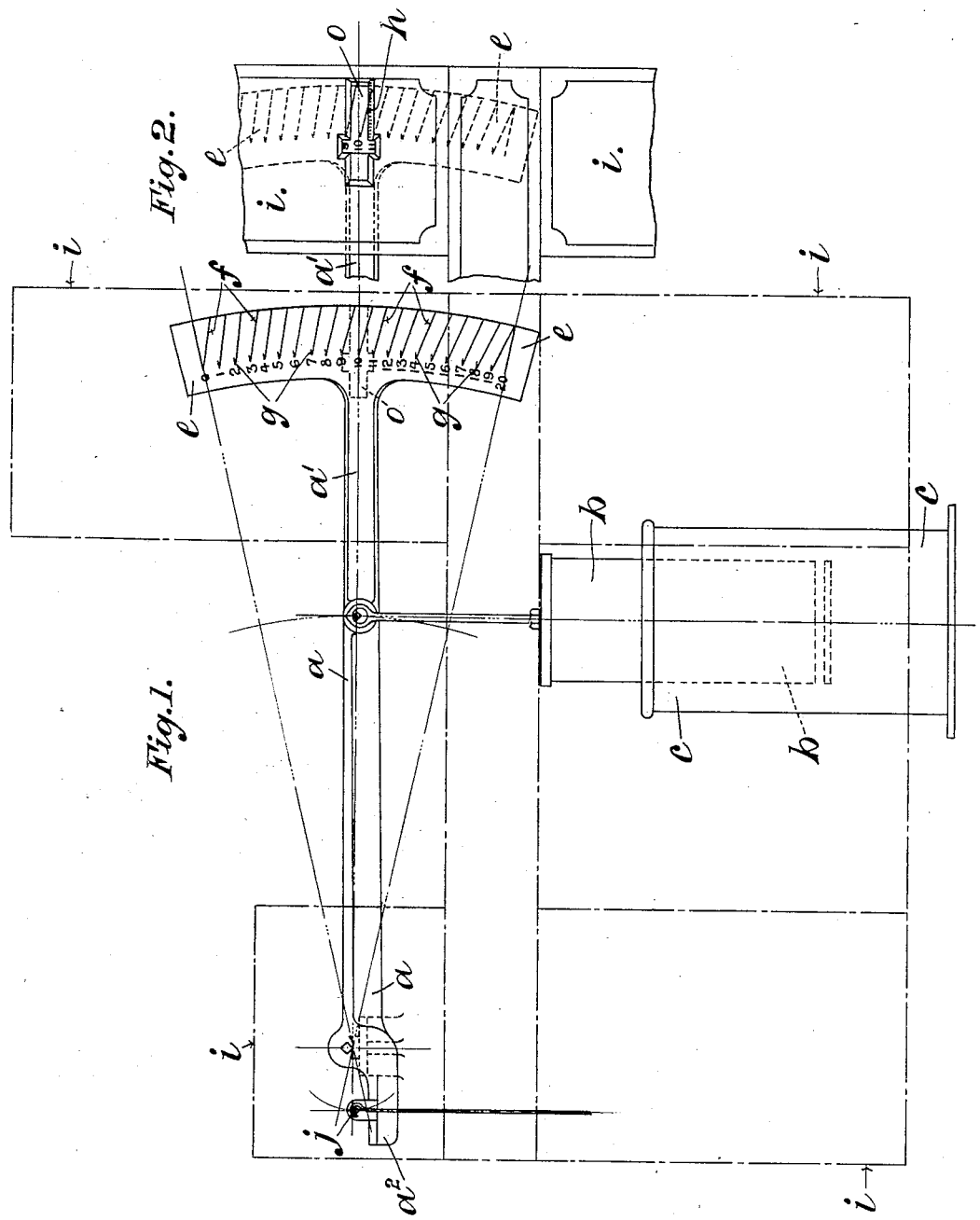

H. POOLEY.
AUTOMATIC INDICATOR WEIGHING MACHINE OR WEIGH BRIDGE.
APPLICATION FILED NOV. 22, 1907.

906,657.

Patented Dec. 15, 1908.
3 SHEETS—SHEET 2.

WITNESSES

INVENTOR
Henry Pooley

UNITED STATES PATENT OFFICE.

HENRY POOLEY, OF BIRMINGHAM, ENGLAND.

AUTOMATIC INDICATOR WEIGHING-MACHINE OR WEIGH-BRIDGE.

No. 906,657. Specification of Letters Patent. Patented Dec. 15, 1908.

Application filed November 22, 1907. Serial No. 403,367.

*To all whom it may concern:*

Be it known that I, HENRY POOLEY, a subject of the King of England, residing at Birmingham, in the county of Warwick, England, have invented new and useful Improvements in or Connected with Automatic Indicator Weighing-Machines or Weigh-Bridges, of which the following is a specification.

This invention has reference to the weighing and indicating mechanisms of lever weighing machines or weighbridges, such as platform weighing machines, and the like, by which the weighing action, and the indication of the weight of the load weighed are automatically effected by the mechanism.

As regards the means by which the automatic weighing is effected, this is of the type in which the amount of weight applied to the steelyard or weighing arm is made to vary automatically according to the different loads being weighed on the platform or weighbridge, by causing automatically by the varying weight of the load being weighed, a body employed in connection with the weighing steelyard, lever or arm, or the like, to be more or less immersed in a fluid, or by the use of a spring or the like to be put under a greater or less stress, or any other resistance or weight to be equivalently put in action in connection with the steelyard, arm, or the like.

The objects and effects, among others, according to the present invention have been to improve and simplify this type of weighing machine indicating mechanism, so as to dispense with the use of gearing or mechanism connected with the indicator, to diminish friction and vibration, and to insure greater accuracy in the weighing indications; a further object of the diminution of vibration being to increase the rapidity and ease with which the automatic indications can be read off by the weighers.

The invention is illustrated in the annexed drawings, and it will be further described with reference to them; the novel characteristics comprised under the invention being set out in the claiming clauses concluding the specification.

Figure 5:
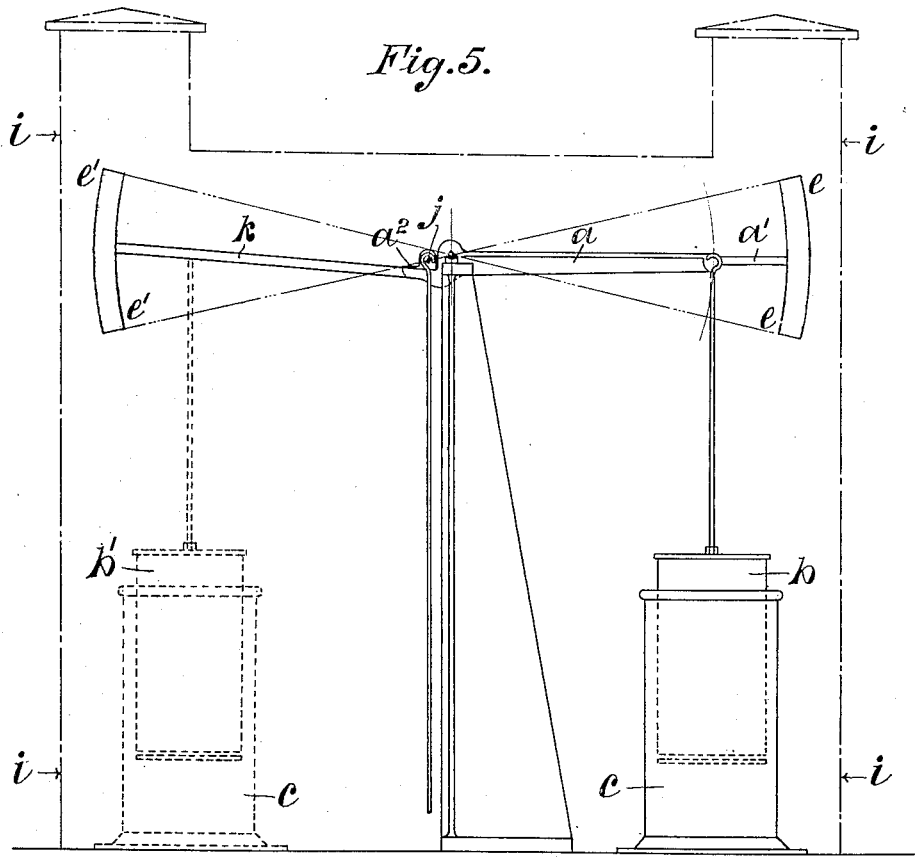
Figure 6:
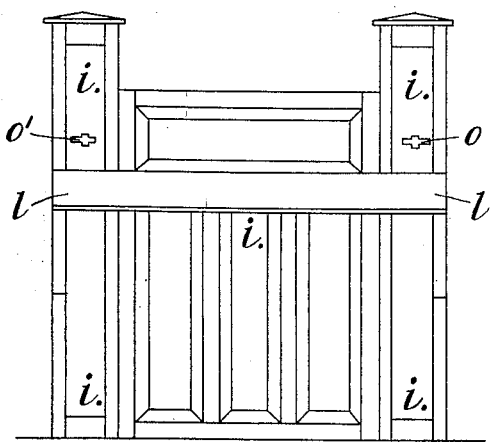

Figure 1 is a side elevation showing the interior parts of the weighing and indicating mechanism; and Fig. 2 is a side elevation showing a portion of the case outside the weight indicating dial, and the window or opening therein. Fig. 3 is an outside elevation showing the casing in which the complete indicating and weighing mechanism is inclosed; and Fig. 4 is a detail showing the weight indicating aperture or window, and a portion of the dial behind, seen through it. Fig. 5 is a view similar to Fig. 1, but showing a modification. Fig. 6 is an elevation and Fig. 7 a side view of said modification.

In a weighing machine involving my improvements, the indicating dial is on or directly connected with the weighing steelyard or arm, and moves with it; and has in a circumferential direction upon its face, numerals, representing one of the orders of weight, preferably the major order of weight, such for instance, as tons or hundredweights, or other order according to the size of load which the machine will be ordinarily designed and constructed to weigh; and this dial is inclosed in a casing which has an opening or window in it of a suitable kind, through which the said numerals representing the major order of weights, can appear in sequence, and preferably not more than two being visible at a time, one of which represents the weight of the mass being weighed, in the major weight, the others being hidden from view. In connection with this major order of weights on the moving dial, there are provided, as hereinafter described, lines, at a tangent to a circle round the center of oscillation of the said weighing steelyard or beam, of which they are tangents. Thus they constitute oblique radial lines, and they operate in connection with a scale along the edge of the aperture or window referred to, marked with divisions of the minor order of weight, or aliquot parts of the major order; and the working edge of this scale will be practically truly radial to the center of oscillation of the said steelyard or arm and dial.

Referring now to the drawings, $a$ is the steelyard or weighing lever, which is connected with the weighing levers of the weighbridge or weighing machine; $e$ is the weight indicating dial; $i$ is the casing of the machine; and $o$ is the weight indicating or exhibiting window or opening. The weight indicating dial $e$ is carried on an extension $a^1$ of the steelyard or weighing lever $a$, and receives whatever motion or degree of movement this steelyard or lever receives. The automatic weighing in the case shown is effected by a weighted body $b$, suspended from the weighing steelyard or arm $a$ working in liquid in a container $c$ in the well known way; that is, according to the amount of this weight $b$ which is out of the liquid, so will be the weight on or resistance to the steelyard, and upon this the position taken by this steelyard or arm will depend; and the weight from the weight transferring or transmission levers of the weighbridge or platform as the case may be, is transmitted to the short arm $a^2$ of the steelyard or arm $a$, either directly, or indirectly, through a supplemental lever or levers. The dial $e$ is in the form of a segment of an annular disk having a flat surface, with numerals circularly arranged upon it, representing the major order of weights; and in connection with each of these numerals an oblique line $f$ is furnished, having upon its inner end, a line $g$, so that the lines, in addition to their serving as minor weight indicating lines, by the line $g$, constitute at their inner ends, a species of spear headed pointers, in connection with the major weight order numerals. These parts form only a portion of the weight indicating means. The other portion is provided by a divided scale $h$, being on one edge of the window or opening $o$ in the casing $i$; the scale in the case shown being for the aliquot parts or divisions of a ton, namely "Cwts.", from 1 to 19; and in connection with this scale line, the oblique lines $f$ work, they being arranged at such an angle, and the divisions of the scale $h$ being of such a magnitude, that when the dial $e$ moves a distance, equal to the distance apart of the major weight order numerals, each line $f$ will intersect the edge line of the scale $h$ at every point along it, so covering the whole scale; and when the machine comes to equipoise, the point where a line $f$ intersects the edge line of $h$, will be the division of the minor order weight scale, which represents the minor order of weight of the load being weighed, which is above the major order of numerals—say Tons—which is exhibited at the window $o$, and which is opposite the indicating pointer of the line which is intersecting some part of the scale edge of $h$.

On the casing $i$, on the side of the window or opening $o$ nearest the major numeral scale of weights, is the word "Tons", or other word specifying this order of weights, which word is inscribed upon a glass cover to the window opening.

As shown in Fig. 4, a line $i^\times$ is drawn on the glass of the opening $o$ to separate the major numerals from the word "Tons" so as to avoid confusion.

Figure 7:
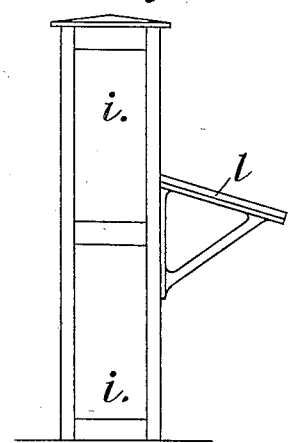

In the modification shown in Figs. 5 to 7, the machine is constructed and adapted more particularly for use in cases where a weighman and a check-weighman are employed, the latter to check the weights taken by the weighman. In this modification, the machine is provided with two sets of dials $e\ e^1$, one, $e$, carried from the long end of the weighing steelyard or arm $a$, as in the modification shown in Figs. 1 to 4, and the other, $e^1$, is carried from an arm or lever $k$ from the short end $a^2$ of the steelyard or arm $a$, it being an extension thereof, and to the knife edges $j$ of which the weight transferring levers or beams are connected directly or indirectly. The case $i$ of this mechanism is adapted to inclose both the steelyard $a$ and its dial $e$, and the arm $k$ and second dial $e^1$; and the part of the case in which this latter dial is disposed and works, is provided with an aperture $o^1$ (see Fig. 6), similar to $o$; the aperture having connected with it, or upon one of its edges, a scale of the minor weight order, say in "Quarters", the major order of weights being "Cwts." The two sets of indicating mechanisms are therefore identical; but as they are on opposite sides of the fulcrum, one of the quadrants or dials $e\ e^1$ will be ascending when the other is falling, and vice-versa; so that the weighman and check-weighman can simultaneously read off the weight of the loads being weighed by the machine, one at one end of the casing, and the other at the other.

The front of the casing $i$ is provided with a writing and reading desk $l$ extending between both sides and with the openings or windows $o\ o^1$ in both sides, at which the weighman and check-weighman can work. This double weight indicating machine is especially useful for pit banks of coal mines or the like where a weighman and check-weighman are required. A further characteristic in connection with this modification shown in Figs. 5 to 7, is the employment of two automatic weighing weights, namely, one $b$, employed in connection with the steelyard or beam $a$, and the other $b^1$—shown in dotted lines—in connection with the arm or lever $k$. This combination and arrangement is advantageous.

In action, it will be seen when one weight $b$ is moving up, the other $b^1$ is moving down; therefore weight on the steelyard or arm on the side of the fulcrum is being added as the arm on one side goes up, while on the other side the weight is being deducted as the arm or lever on that side descends. By the use of these two devices, the area of the poise is divided in halves.

As regards the markings of the dial, it is to be stated that while the particular form or arrangement of markings of the dials shown is advantageous, they may be differently arranged and disposed to operate in connection with a stationary indicating edge in different but equivalent ways, without departing from the characteristics of the invention as comprised or specified in the claiming clauses.

It will be plain as regards the position of the dial of the machine and the opening or window, that it can be disposed horizontally in relation to the weighing steelyard or arm, as shown in the drawings, or they may be vertically disposed, or at any other suitable angle or position in relation to each other.

What is claimed is:—

1. In a weighing machine of the kind herein referred to, the steelyard or weighing arm $a$, a dial $e$ fixed upon said steelyard or weighing arm, and containing upon it the weight indicia, consisting of series of numerals representing the major order of weight, and an oblique line on the face of the dial in connection with each of said numerals; a variable weight mechanism connected with said steelyard or weighing arm; a case $i$ within which the said mechanism is disposed; and a horizontal window $o$ in the case $i$, having its inner end enlarged so as to show numerals on the dial, the outer part of the window showing the oblique lines, said outer part of the window having a weight reading edge practically radial with the center about which the said dial vibrates, and marked with the division of weights representing the minor order of weights, in connection with which the said oblique lines operate; substantially as set forth.

2. In an automatic weighing and weight indicating machine, a weighing steelyard or arm; a variable weight mechanism connected with the said steelyard or weighing arm; an indicating dial on said steelyard or weighing arm at each side of the fulcrum, having upon it a series of numerals representing the major order of weights, and a series of reading markings in connection with each of said numerals; and stationary parts forming lines with which the markings of the dials operate, a casing for the machine, a window therein for each dial, said windows having their inner ends enlarged so as to show the numerals on the dial, the outer small ends of said windows showing the markings on said dial.

In testimony whereof I have signed my name to this specification in the presence of two subscribing witnesses.

HENRY POOLEY.

Witnesses:
LAWRENCE JACOB, Junr.,
THOMAS DAVIS.